United States Patent [19]

Lokhoff et al.

[11] Patent Number: 5,117,313
[45] Date of Patent: May 26, 1992

[54] DIGITAL TRANSMISSION SYSTEM, TRANSMITTER AND RECEIVER TO BE UTILIZED IN THE TRANSMISSION SYSTEM AND RECORD CARRIER OBTAINED BY MEANS OF THE TRANSMITTER IN THE FORM OF A RECORDING MEANS

[75] Inventors: Gerardus C. P. Lokhoff; Gustavus L. P. Van Eijck; Petrus H. M. Arts, all of Eindhoven, Netherlands

[73] Assignee: U.S. Philips Corporation, New York, N.Y.

[21] Appl. No.: 598,287

[22] Filed: Oct. 16, 1990

[30] Foreign Application Priority Data

Jan. 8, 1990 [NL] Netherlands ................. 9000039

[51] Int. Cl.$^5$ ................................. G11B 5/09
[52] U.S. Cl. ................................. 360/40; 360/48
[58] Field of Search ............... 360/40, 48, 72.2, 49

[56] References Cited

U.S. PATENT DOCUMENTS 4,389,681  6/1983  Tanaka et al. ................. 360/48
4,646,170  2/1987  Kobayashi et al. ............. 360/48

Primary Examiner—Vincent P. Canney
Attorney, Agent, or Firm—David R. Treacy

[57] ABSTRACT

A digital transmission system comprising a transmitter (3, 5, 7, 8) and a receiver (14, 15, 16, 18). The medium (6) comprises an information channel ($T_1, T_2, \ldots, T_n$) and an auxiliary channel ($T_{n+1}$). Through the information channel information is transmitted, for example a digital audio signal. Through the auxiliary channel an auxiliary signal is transmitted. This auxiliary signal comprises sync information (100, 101, 102, 103, 104, 105) and additional information (106).

The auxiliary signal is composed of successive blocks ( $\ldots, B_{n-1}, B_n, B_{n+1}, \ldots$ ). A first block ($B_n$) comprises a first block section (header) and a second block section (body). The first block section of the block ($B_n$) contains a sync word (101) and a first codeword (102), in this order. The first block section of the second directly successive block ($B_{n+1}$) contains a sync word (104) and a second codeword (105), in this order. The first codeword (102) expresses that the second block section (106) of the first block ($B_n$) contains additional information. If there is also additional information in the second block section (107) of the second block, the two codewords are equal. If the block section (107) does not contain additional information, the two codewords are unequal. The first block section of the first block ($B_n$) further contains a third codeword (100), the sync word (101) and the first codeword (102), in this order.

The first block section of the scond block ($B_{n+1}$) further contains a fourth codeword (103), a sync word (104) and a second coeeword (105), in this order.

The fourth codeword also expresses that additional information is contained in the second block section (106) of the first block ($B_n$).

The third codeword is now equal to the fourth codeword if the second block section of the block ($B_{n-1}$) directly preceding the first block ($B_n$) also contains additional information. The two codewords are unequal if the second block section of this block ($B_{n-1}$) does not contain additional information. (FIG. 2).

20 Claims, 4 Drawing Sheets

DIGITAL TRANSMISSION SYSTEM, TRANSMITTER AND RECEIVER TO BE UTILIZED IN THE TRANSMISSION SYSTEM AND RECORD CARRIER OBTAINED BY MEANS OF THE TRANSMITTER IN THE FORM OF A RECORDING MEANS

FIELD OF THE INVENTION

The invention relates to a digital transmission system comprising a transmitter and a receiver, for transmitting information through an information channel of a transmission medium, and for receiving the information transmitted through the information channel, which transmission medium further includes an auxiliary channel for transmitting an auxiliary signal consisting of synchronisation (sync) information and additional information, which transmitter comprises an input terminal for receiving the information and is arranged for converting the information applied to the input terminal to a form in which it is suitable for transmission through the information channel of the transmission medium and for receiving the additional information and transmitting the auxiliary signal through the auxiliary channel, whereas the receiver is arranged for receiving and decoding the information transmitted through the information channel and for receiving the auxiliary signal transmitted through the auxiliary channel, while the invention also relates to a transmitter and a receiver to be used in the transmission system and to a record carrier obtained through the transmitter.

BACKGROUND OF THE INVENTION

A transmission system of the type mentioned in the opening paragraph is known, for example, from the book entitled "The Art of Digital Audio" by J. Watkinson, Focal Press 1988. In this book a transmission system is discussed in which the transmitter has the form of an arrangement for recording information on a magnetic record carrier and the receiver has the form of an arrangement for reproducing information from a magnetic record carrier. In this context one may think of arrangements utilising a stationary magnetic head for recording or reading respectively, the information on and from the record carrier. Suchlike systems are described, for example, in chapter 9 of the above book. Chapter 9.20 in this book describes, for example, such a system known under the name of SDAT. In such a system a digital audio signal is recorded on a plurality of adjoining tracks provided or to be provided on the record carrier and positioned lengthwise with respect to this record carrier, and an auxiliary signal containing an additional signal (for example, the subcode information) is recorded on one or more auxiliary tracks forming the auxiliary channel and positioned next to them. This additional information stands for, for example, time information, date information, numbers of the programs (pieces of music), text and possibly graphic information.

It should be observed in this context that the invention is not restricted to transmission systems implementing transmission by means of magnetic record carriers. It is likewise possible for the transmission to be effected via different media. One could think of digital signal transmission through the air (digital audio broadcast) or transmission via optical media, for example, through glass fibres, optical discs or optical tapes.

SUMMARY OF THE INVENTION

It is an object of the invention to provide a plurality of measures for the transmission system, more specifically relating to a highly specific choice of the format in which the additional information (the sub-code information) may be transmitted through the auxiliary channel, so as to provide the highest possible degree of accuracy upon reception of the additional information in the receiver, while maintaining a simplest possible detection of the auxiliary signal in the receiver and there is a further possibility of enabling specific functions in the receiver in response to the detected auxiliary signal.

For this purpose, the transmission system according to the invention is characterised in that the transmitter is arranged for generating the auxiliary signal in the form of successive blocks, a first and a directly successive second block being composed of first block sections comprising the sync information and second block sections for containing the additional information, the first block section of the first block containing a sync signal and a first codeword, in this order, the second block section of the first block containing additional information, the first block section of the second block containing a sync signal and a second codeword, in this order, in that the second codeword is equal to the first codeword if the second block section of the second block likewise contains additional information, and in that the second codeword is unequal to the first codeword if the second block section of the second block does not contain additional information.

A further elaboration of the basic idea is characterised in that the first block section of the first block contains a third codeword, the sync signal and the first codeword, in this order, in that the first block section of the second block contains a fourth codeword, the sync signal and the second codeword, in this order, in that the third codeword is equal to the fourth codeword if the second block sections of the first block and the third block directly preceding the first block contain the additional information and in that the third codeword is unequal to the fourth codeword if the second block section of the first block does contain the additional information and the second block section of the third block does not contain the additional information.

The underlying thought is that on the receive side the third codeword may be used for locking in the receiver so that the receiver is thus enabled to detect the sync word following this third codeword. It is assumed here that the receiver has not yet been locked in or has been locked out due to the lack of additional information in second block sections of one or more successive blocks. After the receiver is locked in, under the influence of the third codeword received previously, the receiver can then detect the sync word and the first codeword so that a better accuracy of detection may be realised when detecting the blocks. The detection of the first codeword in the first block section of the first block furthermore provides the receiver in the system with information on the fact that the second block section of the first block contains the additional information. If the second codeword in the first block section of the second successive block is not equal to the first codeword, the receiver will appreciate that the second section of the second block does not contain additional information. If the second codeword is indeed equal to the first codeword, the second section of the second block does contain additional information.

If the transmitter is used in the form of an arrangement for recording formation on a magnetic record carrier and the receiver in the form of an arrangement for reading information from the record carrier, the second and fourth codewords may be useful. During the transport of the record carrier at a normal speed, but in negative direction, the second codeword may now be used for locking in the receiver, so that the receiver is subsequently able to detect both the fourth codeword and the sync word following this second codeword. (Also in this case it is assumed that the receiver has not yet been locked in or has been locked out due to the lack of additional information in second block sections of one or more successive blocks).

After the receiver has locked in under the influence of the first received second codeword, the receiver can then detect the sync word and the fourth codeword, so that a better accuracy of detection may be realised when the blocks are detected.

In order to implement in both directions the same detecting mechanism for detecting a second block section containing the additional information, the first codeword is preferably assumed to be equal to the fourth codeword. However, this is not a necessity. Another possibility is to assume that the fourth codeword is equal to the reversed first codeword. Reading out the first codeword in one direction of transport of the record carrier will then provide the same read codeword as reading out the fourth codeword in a direction opposite to this direction of transport, which also renders the detection very simple.

The detection of the fourth codeword in the first block section of the second block at normal speed in negative direction, which fourth codeword, as observed before, is preferably equal to the first codeword, provides the receiver in the system with information on the fact that the second block section of the first block contains the additional information. If the third codeword in the first block section of the first block is not equal to the fourth codeword, the receiver will appreciate that the second section of the block preceding the first block does not contain additional information. If, alternatively, the third codeword is indeed equal to the fourth codeword, the second section of the block preceding the first block will certainly contain additional information.

The detection options as described hereinbefore are specifically useful in an embodiment of the invention in which the transmitter is arranged for alternately accommodating the additional information in second block sections of m1 successive blocks and not accommodating the additional information in the second block sections of m2 successive blocks. So, the second block sections of the m2 successive blocks are empty. While receiving these m2 blocks, the receiver may become locked out. Since the additional information in the second block section of a block is preceded and followed by first block sections containing the third or second codeword respectively, the receiver may become locked in again. After detecting the first or fourth codeword respectively in these first block sections, the receiver will recognise that a second block section of a block is to follow, containing the additional information.

If the transmitter described hereinbefore is an arrangement for recording information on a magnetic record carrier, this relates to a recording of the record carrier at a normal speed in forward direction. In that case the operation of the receiver described hereinbefore relates to a situation in which a record carrier is read out at a normal speed in forward or reverse direction.

Non-recording of the additional signal in the second block sections of the m2 successive blocks may entail that the record carrier is erased at the moment of recording.

The first codeword may be unequal to the third codeword. In that case the first codeword is a q-bit digital number composed of alternating n "ones" and n "zeros", and the third codeword is the inverse number of the digital number of the first codeword, n being an integer exceeding or equal to 1 and q an interger exceeding or equal to 2. The first codeword is preferably the 10-bit digital number "1010101010", and the third codeword is the 10-bit digital number "0101010101". The sync word may be a 10-bit digital number, preferably equal to "0100111110" or "0000111110".

The transmission system may further be characterised in that the recording means is further arranged for recording a signal in the second block sections of a number of p successive blocks, where p then exceeds m1, to identify a position lengthwise on the track on the record carrier. Filling the second block sections of the odd blocks in the p successive blocks, if $m1=m1=p$, may be effected in various fashions. The recording means may for this purpose once again record the information stored in a second block section of an even block, but now record it in the second block section of the successive odd block. Another option is that in the second block sections of the odd blocks of the p successive blocks random signals are stored, for example, alternating "zeros" and "ones".

This measure has for its object to create in the reproduction arrangement the possibility to detect, for example, the beginning of a recording in the case of a record carrier transport speed which is enhanced with respect to the normal reproduction speed, although the detection of the information on the auxiliary channel is not very well feasible due to the retracted position of the reproduction head with respect to the record carrier. In order to achieve this, the reproduction arrangement is further to be characterised in that it comprises an envelope detector having an input for receiving the information read from at least the one different track and an output for generating a control signal, in that the envelope detector is arranged for generating a first control signal upon detection of an envelope varying in amplitude with time in the case of a specific transport speed of the record carrier and for generating a second control signal upon detection of an envelope having a constant amplitude in a specific time interval, in that the output of the envelope detector is coupled to a control signal input of transport means for transporting the record carrier, and in that the transport means are arranged for switching off this transport speed upon reception of the second control signal.

BRIEF DESCRIPTION OF THE DRAWINGS

The invention will be further explained and described with reference to a number of embodiments, in which:

FIG. 2 shows in FIG. 2a the serial data stream of the auxiliary signal and the contents of the frames in this signal, and in FIG. 2b the contents of the blocks in this signal;

FIG. 3 shows in FIG. 3a a number of consecutive blocks, in FIG. 3b the envelope of the signal stored in the blocks, and in FIG. 3c the output signal of the integrator in the envelope detector of FIG. 5;

FIG. 6 shows in FIGS. 6a, 6b and 6c and 6d three different data streams on the auxiliary channel;

DESCRIPTION OF THE EMBODIMENTS

Figure 1:
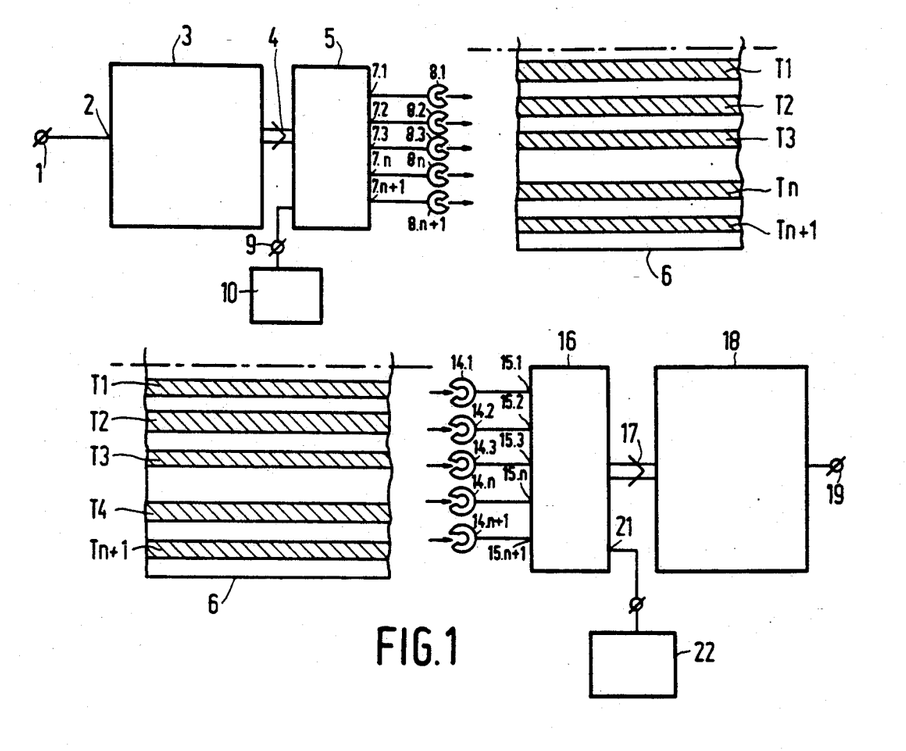
FIG. 1 shows an embodiment of the digital transmission system.

FIG. 1 shows an exemplary embodiment of the digital transmission system, having an input terminal 1 for receiving information, for example, in the form of an audio signal, a mono or stereo audio signal, which terminal is coupled to an input 2 of an encoding unit 3. This encoding unit 3 may, for example, have the form of a subband coder as described in one of previously filed Dutch patent applications 88.02.769 (PHN 12.735) and 89.01.032 (PHN 12.903), or European patent application 289.080 (PHN 12.108), all in the name of the Applicants.

In a subband coder of this type the audio signal is digitised and sampled and subsequently, in a plurality of subband filters implementing sample frequency reduction, split up into a plurality of subband signals. These subband signals are applied through line 4 to a unit 5 in which they are rendered suitable for transmission through the medium. The unit 5 comprises, for example, an 8-to-10 converter. Such an 8-10 converter is described, for example, in European Patent Application 150.082 (PHN 11.117) in the name of the Applicants. In this converter 8-bit data words are converted into 10-bit codewords. Interleaving may occur. All this has for its object to enable an error correction of the received information at the receive end.

The medium through which the information is transmitted is in the form of a magnetic record carrier 6. Only part of one half of the record carrier viewed lengthwise is represented.

On the record carrier 6 a number of tracks $T_1$ to $T_{n+1}$ are depicted running lengthwise over the record carrier. The tracks $T_1$ to $T_n$ are intended to record the information on applied to the input terminal after encoding.

Unit 5 is arranged for distributing the encoded information over and applying this distributed and encoded information to n outputs 7.1 to 7.n. These n outputs are coupled to n recording heads 8.1 to 8.n respectively. With these recording heads the information is recorded on the n tracks $T_1$ to $T_n$ respectively, on the record carrier.

Unit 5 further has an input 9 for receiving the auxiliary signal. The auxiliary signal comprises sync information and an additional signal. The additional signal may either be applied from the exterior or be generated internally in an auxiliary signal generator 10. For the additional signal, one should think of time, date information, numbers of programs (pieces of music), text and possibly graphic information, as has been mentioned hereinbefore.

Unit 5 is arranged for rendering the auxiliary signal suitable so that it may be recorded on an additional track $T_{n+1}$ on the record carrier 6. For this purpose unit 5 has an output 7 n+1 coupled to a recording head 8.n+1.

Figure 2A:
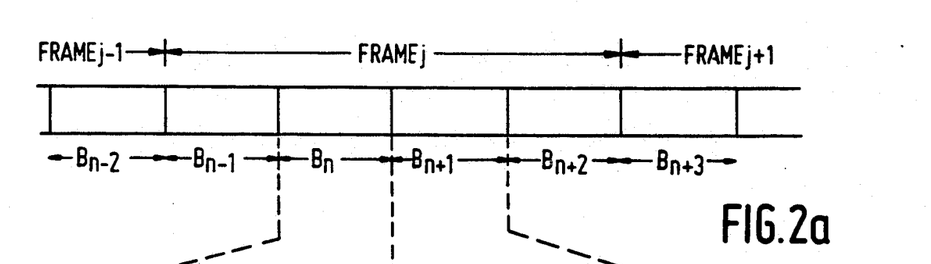
Figure 2B:
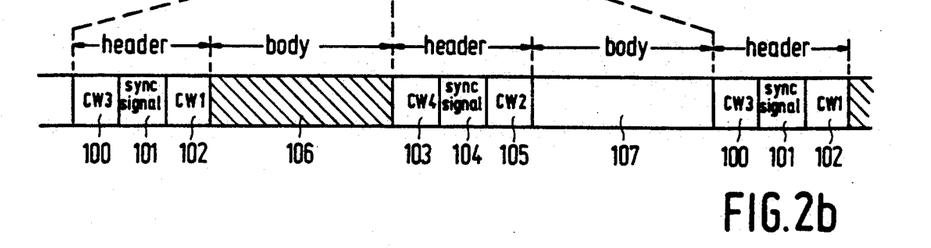

The data stream of the auxiliary signal as offered by the unit 5 to the recording head 8.n+1 is shown in FIG. 2.

FIG. 2a shows that the data stream is constituted by consecutive frames ..., j−1, j, j+1, .... Each frame comprises a number of consecutive blocks. According to FIG. 2a there are four blocks. The frame may be terminated by an interframe gap.

Each block is constituted by a first block section (the header) and a second block section (the body). The first block section of a specific first block, that is block $B_n$ in the block sequence ..., $B_{n-2}$, $B_n$, $B_{n+2}$, ... comprises a third codeword cw3, a sync signal (or sync word) 101 and a first codeword cw1, in this order. The first block section of the directly successive block, that is block $B_{n+1}$, comprises a fourth codeword cw4, a sync word 104 and a second codeword cw2, in this order. The first codeword cw1 is equal to the fourth codeword cw4.

Figure 3A:
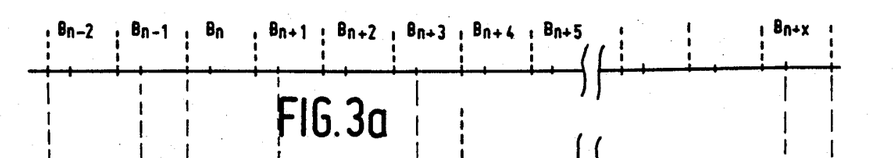

The second block section of block $B_n$ accommodates the additional signal. This is shown diagrammatically by the hatching in this second block section. The second block section of the block $B_{n+1}$ does not accommodate an additional signal and thus remains empty. This implies that the second codeword cw2 is unequal to the first (and second) codeword. Not accommodating the additional signal in a second block section of a block may in fact mean that the arrangement erases the record carrier when recording this second block section. The data stream as represented in FIGS. 2 and 3 is such that always the second block sections of even blocks ..., $B_{n-2}$, $B_n$, $B_{n+2}$, ... accommodate the additional signals and that the second block sections of the odd blocks .., $B_{n-1}$, $B_{n+1}$, ... are empty. This means that the third codeword cw3 is equal to the second codeword cw2 and that these codewords are unequal to the first (and fourth) codeword(s).

The data stream may have a different appearance as will be explained with reference to FIG. 6.

The first codeword (which is equal to the fourth codeword) may comprise an alternating number of n "ones" and a number of n "zeros". If cw1 is a 10-bit number, cw1 would, for example, be equal to "1010101010".

The third codeword cw3 (which in this case is equal to the second codeword) is the inverse word of cw1. This means in the preceding example that cw3 is equal to the 10-bit number "0101010101".

The sync word may be chosen at random, but one preferably chooses a word that occurs rarely, or not at all in the auxiliary signal data stream. An example of a 10-bit sync word is: "0100111110" or "0000111110". The choice of which of the two digital bit patterns is chosen for the sync word depends on the digital sum value (DSV) of the digital auxiliary signal. During the recording of an information signal on the record carrier, the recording means thus records only in the second block sections of the even blocks the additional signals and not in the second block sections of the odd blocks.

In order to register the beginning of a recording (piece of music) the means is designed for recording specific information also in the second block sections of odd blocks during a number of consecutive blocks. This is shown diagrammatically in FIG. 3.

Figures 3B, 3C:
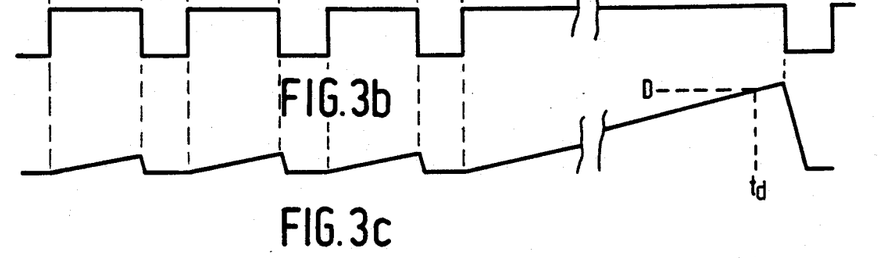

FIG. 3a shows a plurality of consecutive blocks. At block $B_{n+x}$ a new recording commences. The end of the preceding recording may be situated at block $B_{n+x-1}$. In that case the two recordings present an uninterrupted transition. The end of this recording may lie at an earlier instant, for example, at block $B_{n+1}$. In that case there will be a pause between the two recordings. FIG. 3b shows the envelope of the signal read from the track $T_{n+1}$. For the blocks $B_{n-2}$ to $B_{n+3}$ this envelope is a magnitude having alternately a specific amplitude and then a smaller amplitude, for example, zero. From block $B_{n+4}$ to block $B_{n+x}$ the envelope remains "high". When the envelope remains high for a rather long period of time corresponding to x-4 blocks having two filled block sections, it indicates the beginning of the new recording (piece of music).

The "filling" of two block sections of the odd blocks may be effected in different ways. For example, the information accommodated in the second block section of block $B_{n+4}$ could be repeated and stored in the second block section of block $B_{+5}$, etc. However, in fact it is only a matter of the second block sections of the odd blocks being filled, irrespective of the information these block sections would contain. So these block sections could also be filled with random information, for example, alternating "zeros" and "ones".

The use of the information stored on the auxiliary track $T_{n+1}$ will be further explained in the sequel with reference to the discussion of the receiver.

FIG. 1 shows a receiver in the form of an arrangement for reading information from the record carrier 6. The arrangement comprises a plurality of reading heads 14.1, 14.2, 14.3, ..., 14.n, 14.n+1, each coupled to an input 15.1, 15.2, 15.3, ..., 15.n and 15.n+1 respectively, of a reading unit 16.

The unit 16 is arranged for converting encoded and interleaved information read from the tracks $T_1$ to $T_n$ into the original subband signals and for applying these subband signals over bus/line 17 to the subband decoder 18, which again combines the subband signals to the digital (audio) signal by means of an enhancement of the sampling rate, which signal may be applied to output 19 after the digital-to-analog conversion. For decoding the signal read from the record carrier, the unit 16 thus has to be able to deinterleave and reconvert the 10-bit channel words to the 8-bit information words so as to carry out an error correction.

Unit 16 is further arranged for reading additional information from the track $T_{n+1}$ by means of the reading head 14.n+1. Unit 16 can derive the system clock from the signal read from the track $T_{n+1}$. For this purpose, the information read from the track $T_{4+1}$ is applied to a PLL.

When the record carrier is initially read out at the normal reproduction speed of the record carrier in forward direction, the arrangement first is to be locked in. This may be realised by means of the third codeword cw3 in the first block section of the first block, for example $B_n$, which is read out, which is the codeword 100 in FIG. 2b. The arrangement, after being locked in, is able to detect the sync word 101 and then the first codeword cw1, which is the codeword 102 in FIG. 2b. The arrangement now knows that a second block section of an even block containing additional information is to follow, and can thus detect and further process the information contained in this block section.

This processing may imply that the time information is detected, which may be: the time elapsed of the piece of music being reproduced (relative time), or the overall time (absolute time). This time information may be applied to an output 21. This output may be coupled to a display 22 on which the time may be visualised.

Another possibility is that the title of the piece of music is derived from the information and is applied via the output 21 to the display 22, so that it may be visualised there. Yet another possibility is the number of the piece of music.

Figure 4:
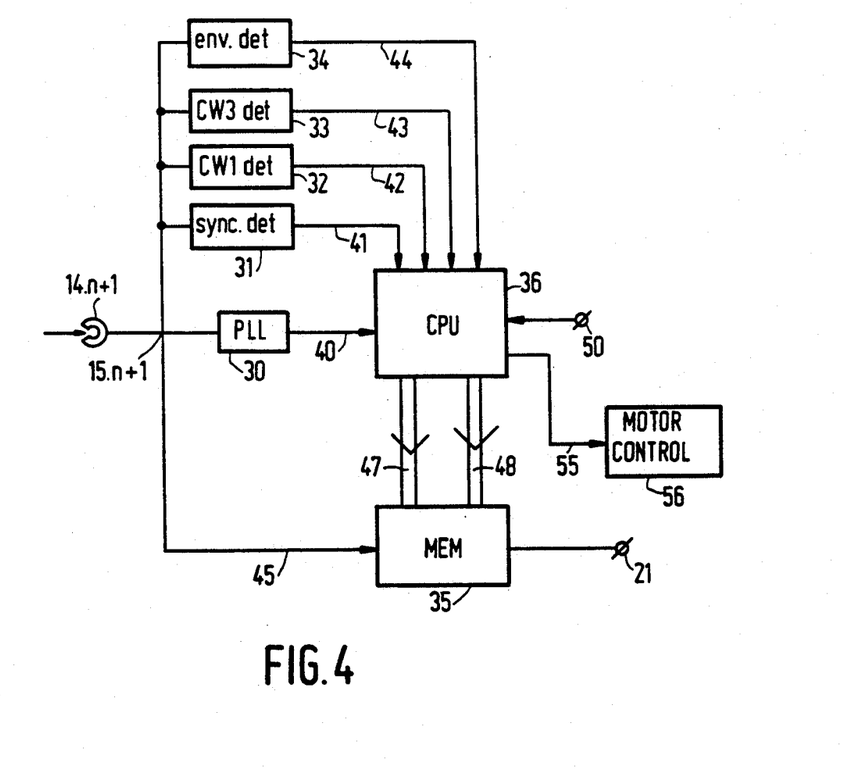
FIG. 4 shows the receiver in the transmission system, in the form of a reading arrangement.

FIG. 4 shows by way of a diagram a further elaboration of the receiver of FIG. 1, at any rate that part of the receiver intended for reading the signal from the track $T_{n+1}$. The input 15.n+1 is coupled to inputs of the phase locked loop PLL 30, a sync word detector 31, a detector 32 for detecting the first codeword cw1, a detector 33 for detecting the third codeword cw3, an envelope detector 34 and a memory 35.

The receiver further includes a central processing unit 36. If the system is locked in, the central processing unit 36 is informed thereof by the PLL 30 through line 40. The sync word detector 31 and the codeword detector 32 can now detect the sync word 101 and the first codeword cw1 102 in the first block section of the first even block $B_n$ that is read out. Upon detection thereof they send the detection signals to the central processing unit 36 through lines 41 and 42.

The central processing unit 36 now knows that the information contents of the second block section of the even block $B_n$ is applied to the memory 35 through line 45. The central processing unit 36 then generates an address sequence applied to the memory 35 over bus/line 47. The information from the second block section can now be stored in memory 35.

Under the influence of a control signal which may be applied to the central processing unit 36 through input 50, a selection may be made which part of the information read from the second block section can be visualised on the display 22. The control signal applied through input 50 can be determined by a user of the arrangement. For visualising on the display 22 the information desired by the user, for example, the relative time (within a piece of music), an address sequence applied to memory 35 over bus 48 is generated by the central processing unit 36 under the influence of the control signal applied to input 50. The time information is now read from memory 35 and, after a decoding as required, applied to terminal 21.

When reading out the record carrier backwards at a normal reproduction speed, the arrangement is able to become locked in when it uses the second codeword cw2, i.e. the codeword 105 in FIG. 2b. The PLL 30 then produces a detection signal through line 40 to the central processing unit 36. Subsequently, the sync word detector 31 can detect the sync word 104 and the codeword detector 32 the fourth codeword cw4, i.e. the codeword 103 in FIG. 2b which is equal to the first codeword cw1. Thereupon, the two detectors 31 and 32 generate detection signals which are applied to the central processing unit 36 through lines 41 and 42. The central processing unit 36 now recognizes that the contents of a second block section of an even block, containing the additional information, are offered to the terminal 15.n+1.

The central processing unit 36 recognizes that the transport device of the record carrier is directed backwards and generates the same address sequence as above but now in reverse order. This is due to the fact that since the transport device of the record carrier is operating in reverse order also the information from the second block section of the even block is applied to the input 15.n+1 in reverse order. Due to the reverse order of the addresses the information read from the second block section is nevertheless stored at the right location in memory 35.

Deriving the number of the piece of music from the additional information at the reproduction speed of the record carrier may be used for searching for a different piece of music. For example, if at this moment the second piece of music is reproduced and the user indicates, by means of a control signal through input 50, his wish to listen to the fifth piece of music, the arrangement will transport the record carrier at an increased speed in forward direction. At this increased speed the heads 14.1 to 14.n+1 are slightly retracted from the record carrier, so that the tape-head contact does not hinder the record carrier transport.

The track $T_{n+1}$ cannot be simply read now so that the codewords cw1 and cw3, the sync words, or the information contained in the two block sections of the even blocks can be detected or read out respectively. However, in order to be able nevertheless to detect the beginning of a next piece of music, the envelope detector 34 is inserted. This detector 34 detects the envelope of the signal read from track $T_{n+1}$ by the head 14.n+1. This envelope is represented in FIG. 3b.

Figure 5:
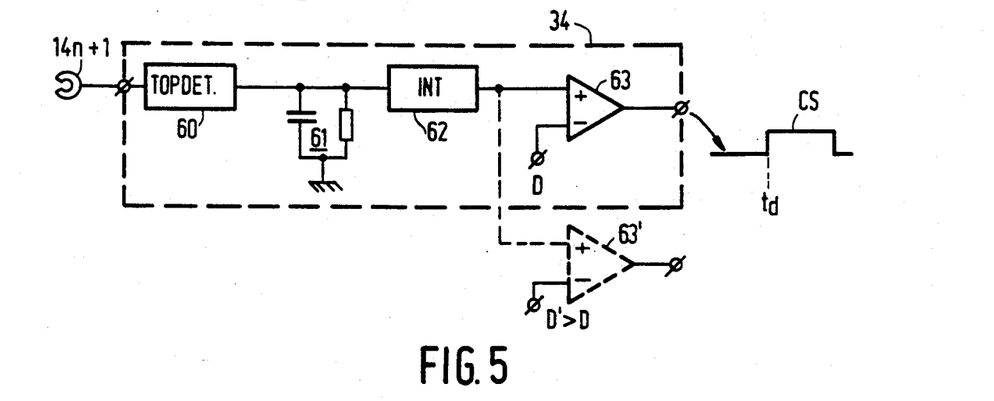
FIG. 5 shows the envelope detector in the arrangement shown in FIG. 4.

FIG. 5 shows an exemplary embodiment of the envelope detector 34 of FIG. 4. This detector comprises a top detector 60, a low-pass filter 61 constituted by a parallel connection of a capacitor and a resistor, an integrator 62 and a threshold detector 63.

The signal read out by the head 14.n+1 is applied to the input of the detector 34. The top detector 60 and the low-pass filter 61 produce the envelope signal of FIG. 3b. This envelope signal is applied to the integrator 62. FIG. 3c shows the output signal of the integrator 62. In the threshold detector 63 the signal is compared to the threshold value D. Once the threshold value is exceeded, i.e. at instant td, cf. FIG. 3c, the threshold detector 63 will produce a high control signal cs, cf. FIG. 5.

For example, if the record carrier is to be transported from for example the second to the fifth piece of music at high speed, the central processing unit 36 is thus to count the control signal cs three times. Once a counter included in the central processing unit 36 has counted the occurrence of the control signal cs three times, this unit 36 will generate a control signal which is applied to the motor control unit 56 through line 55. Under the influence of this control signal the high transport speed is switched off.

The record carrier may then already have shot through too far. In that case the central processing unit 36 will apply to the motor control unit 56 through line 55 a control signal on the basis of which the record carrier is rewound at normal reproduction speed but in reverse direction. The track $T_{n+1}$ can now be read out in a normal fashion by the head 15.n+1. The codewords and the sync words can thus be detected and the information contained in the second block sections of the even blocks can be read out so that the beginning of the fifth piece of music can be ascertained. The arrangement is muted for the duration of this rewinding. The record carrier can now be stopped so that the user can switch the arrangement to reproduction or the arrangement itself automatically switches to reproduction.

A search for a previous piece of music, that is to say: the seventh piece of music is being reproduced and the user wishes to listen to the second piece of music, is made in a similar fashion. The record carrier is rewound at increased speed. The envelope detector 34 detects the envelope and the counter in the central processing unit 36 counts the number of control signals cs, cf. FIG. 5. If the central processing unit has counted six control signals cs, the increased reverse speed is switched off and the change is directly made to the reproduction speed in forward direction.

In this case the record carrier may also have shot through. The last part of the first piece of music will then be read out first. The arrangement can then be muted until the beginning of the second piece of music is detected.

Figure 6A:
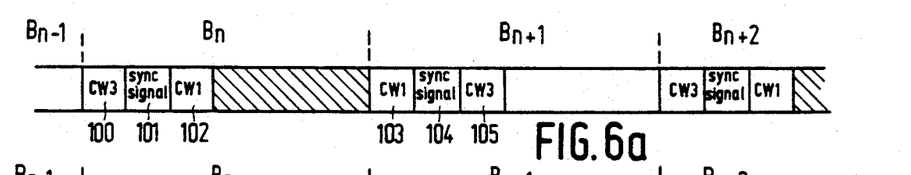
Figure 6B:
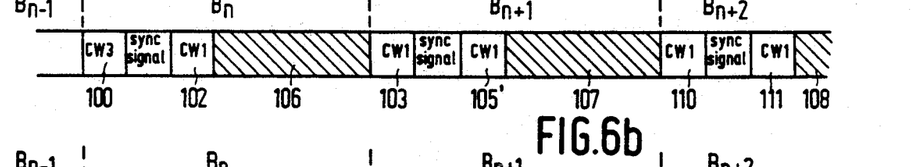
Figure 6C:
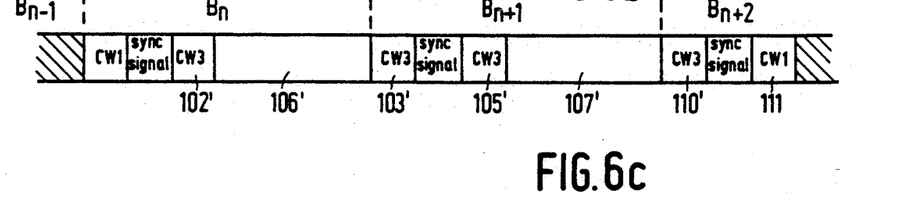

FIG. 6 shows in FIG. 6a the same data stream as already described with reference to FIGS. 2 and 3. It will be distinct that the second block sections in the even blocks ..., $B_n$, $B_{n+2}$, ... contain the additional signal, whereas the second block sections of the odd blocks ..., $B_{n-1}$, $B_{n+1}$, ... are empty. It will be evident that the codewords 102 and 103 are equal and that the codewords 100 and 105 are equal, whereas cw1 is unequal to cw3. FIG. 6b shows a data stream of a number (m1) of consecutive blocks $B_n$, $B_{n+1}$, $B_{n+2}$, ... in whose second block sections the additional signal is contained. This is shown in the diagram by means of the shaded portions in the second block sections 106, 107 and 108. The block $B_{n-1}$ is the last block in a series of m2 consecutive blocks containing empty second block sections. It will be evident that the third and the second codewords 100 and 105' are unequal. The second codeword 105' is now again equal to the first codeword cw1. The receiver now recognizes that the second block section 107 of the block $B_{n+1}$ also contains additional information. The codeword 110 of the block $B_{n+2}$ is in this case also equal to the second codeword. If the data stream is received in reverse order (for example, when reading a magnetic record carrier moving backwards), the reading unit will known that the block $B_{n+1}$ directly preceding block $B_{n+2}$ contains a second block section in which additional information is stored. FIG. 6c provides yet another example and shows m2=2 consecutive blocks $B_n$, $B_{n+1}$ which do not contain additional information in the second block sections. It will be distinct that the first block section of the block $B_{n+1}$ now contains the third codeword cw3, the sync signal and again the third codeword cw3, in this order. In the two data transport arrangements, at the normal reading speed of the record carrier, it will become evident to the system upon detection of the codeword 103', 105' respectively, that the second block section 106', 107' respectively, does not contain additional information. It should be observed in this context that the first block section of block $B_{n+1}$ in FIG. 6c also might have been empty.

Filling or not second block sections of blocks may also be used for accommodating an additional digital signal in the auxiliary signal. If a second block section were filled this would mean a digital "1" in the additional signal and an empty second block section a "0" in the additional signal. The detection of this additional signal may be effected, for example, in the following way. The signal read by the head 14.n+1, cf. FIG. 5, is applied to a phase locked loop 70, cf. FIG. 8. This may be the phase locked loop 30 of FIG. 4. By dividing the clock frequency of the voltage controlled oscillator by a specific value, a sample frequency CP is obtained, cf. FIG. 8, which is applied to a level detector 71. An input of this level detector 71 is coupled to the low-pass filter 61 of FIG. 5. FIG. 7a shows again the consecutive blocks in the data stream. FIG. 7b shows the output signal of the lowpass filter 61. FIG. 7c shows sampling pulses CP as applied to the level detector 71. The position of these sampling pulses in time and the frequency of these pulses is such that exactly the signal level can be detected in the two block sections of consecutive blocks. FIG. 7d represents the output signal of the level detector 61. This signal corresponds with the additional signal.

It will be obvious that the number of consecutive blocks having block sections housing the additional signal, must not be of such a value that the threshold detector 63 in FIG. 5 is activated. The maximum number of "ones" in the additional signal is thus restricted.

Furthermore, it is possible in FIG. 5 to couple a second threshold detector 63', represented by broken lines in this Figure, to the output of the integrator 62. The threshold D' is selected to exceed the threshold D. The output of the threshold detector 63 is used for detecting the beginning of a piece of music. The end of the record carrier could now be determined by providing even more than x-4 blocks, cf. FIGS. 3a and 3b, with filled second block sections. The output signal of detector 63' can now be used to stop the record carrier at the end of the tape, or have it reversed automatically (autoreverse).

Figure 9:
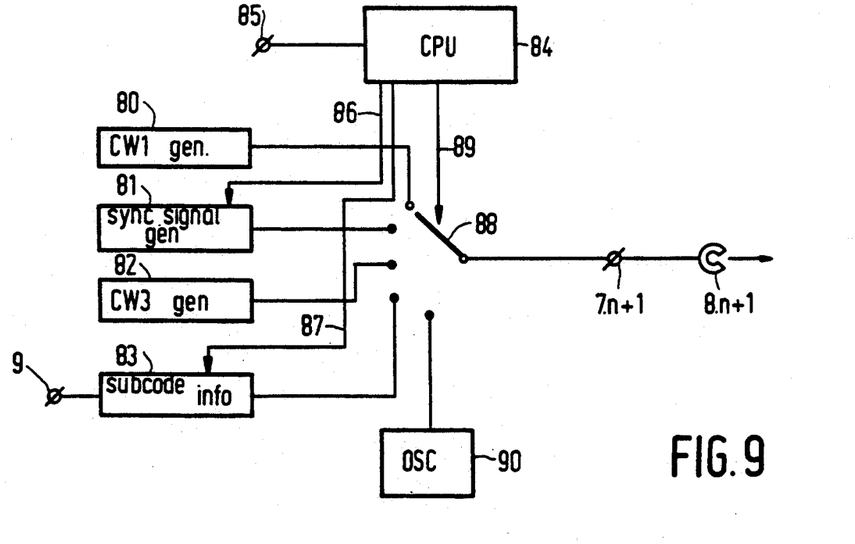
FIG. 9 shows a recording means.

FIG. 9 shows a recording arrangement comprising a codeword generator 80 generating the first codeword, and a sync word generator 81 generating one of the two sync words in response to the Digital Sum Value (DSV) in the digital information. This information is applied to the generator 81 through the line 86 from a central processing unit 84. The arrangement further includes a codeword generator 82 for generating the third codeword and a unit 83 for generating subcode information. An input of this unit is coupled to the input terminal 9, cf. FIG. 1. The unit 83 provides the information that is to be contained in the second block sections of the blocks. This is effected under the influence of a control signal applied to the unit 83 by the central processing unit 84 through line 87.

The additional signal may be applied to input 85 (if available). The central processing unit 84 drives a controllable switch 88 through a line 89. The switch 88 may assume one out of five positions in response to the control signal on line 89. In the first position the generator 80 is coupled to the output 7.n+1. In the second position the generator 81 is coupled to the output 7.n+1. In the third position the generator 82 is coupled to the output 7.n+1. In the fourth position the unit 83 is coupled to the output 7.n+1. In the fifth position the output of an erase oscillator 90 is coupled to the output 7.n+1.

For recording the information as represented in FIG. 6a in the blocks $B_n$ and $B_{n+1}$, switch 88 then has assumed the positions 3, 2, 1, 4, 1, 2, 3 and 5.

For recording the information as represented in FIGS. 6b and 6c the order of the positions of the switch 88 may then simply be derived.

Figure 7:
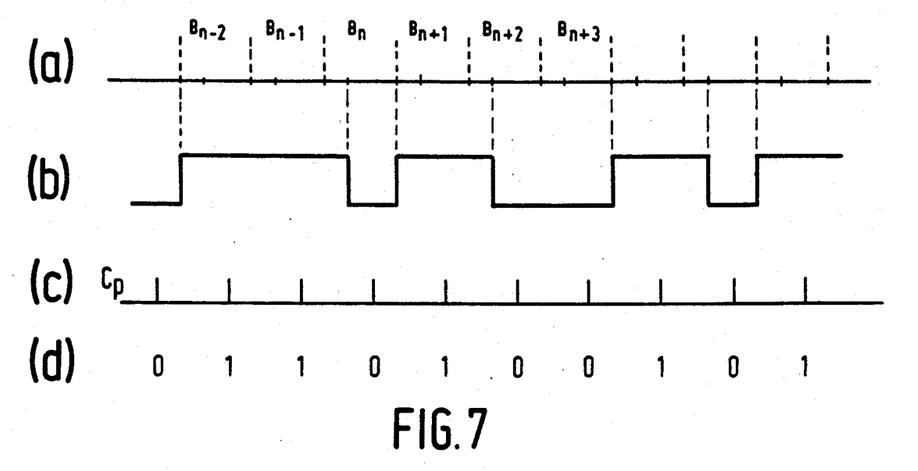
FIG. 7 a through d shows the data stream on the auxiliary channel when an additional digital signal is fed.
Figure 8:
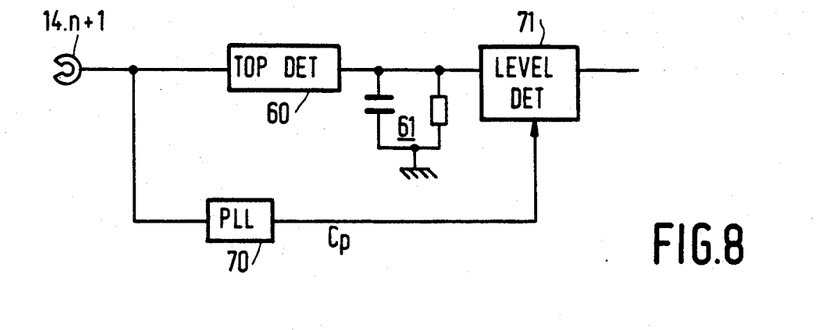
FIG. 8 shows an arrangement for reading the additional digital signal.

For feeding the additional signal, as explained with reference to FIG. 7, the central processing unit 84 generates control signals to the unit 87 and switch 89 in response to the signal applied to its input 85, so that at the right moments the second block sections are filled or rather not filled.

It will be obvious that for this purpose the unit 83 is to comprise a memory in which the information to be contained in the second block sections can be buffered, as required.

We claim:

1. A digital transmission system comprising:
a transmitter and a receiver, for transmitting information through an information channel of a transmission medium, and for receiving the information transmitted through the information channel, which transmission medium further includes an auxiliary channel for transmitting an auxiliary signal containing synchronisation (sync) information and additional information,
said transmitter comprising an input terminal for receiving the information and means for converting the information applied to the input terminal to a form in which it is suitable for transmission through the information channel of the transmission medium and for receiving the additional information and transmitting the auxiliary signal through the auxiliary channel, said receiver comprising means for receiving and decoding the information transmitted through the information channel and for receiving the auxiliary signal transmitted through the auxiliary channel, and
said transmitter comprising means for generating the auxiliary signal in the form of successive blocks, a first and a directly successive second block being composed of first block sections comprising the sync information and second block sections for containing the additional information, the first block section of the first block containing a sync signal and a first codeword, in this order, the second block section of the first block containing additional information, the first block section of the second block containing a sync signal and a second codeword, in this order, and wherein the second codeword is equal to the first codeword if the second block section of the second block likewise contains additional information, and the second codeword is unequal to the first codeword if the second block section of the second block does not contain additional information.

2. Transmission system as claimed in claim 1, characterised in that the first block section of the first block contains a third codeword, the sync signal and the first codeword in this order, in that the first block section of the second block contains a fourth codeword, the sync signal and the second codeword, in this order, in that the third codeword is equal to the fourth codeword if the second block sections of the first block and a third block directly preceding the first block contain the additional information and in that the third codeword is unequal to the fourth codeword if the second block section of the fist block does contain the additional information and the second block section of the third block does not contain the additional information.

3. Transmission system as claimed in claim 2, characterised in that the first codeword is equal to the fourth codeword.

4. Transmission system as claimed in claim 3, characterised in that the first codeword is unequal to the third codeword, in that the first codeword is a q-bit digital number composed of alternating n "ones" and n "zeros", in that the third codeword is the inverse number of the digital number of the first codeword, in that n is an integer exceeding or equal to 1 and in that q is an integer exceeding or equal to 2.

5. Transmission system as claimed in claim 4, characterised in that the first codeword is the 10-bit digital number "1010101010" and in that the third codeword is the 10-bit digital number "0101010101".

6. Transmission system as claimed in claim 1, characterised in that the sync signal is a 10-bit digital number.

7. Transmission system as claimed in claim 1, characterised in that the transmitter comprises means for accommodating the additional information in the second block sections of m1 successive blocks and not in the second block sections of m2 blocks successive thereto, and in that m1 and m2 are integers exceeding or equal to 1.

8. Transmission system as claimed in claim 7, characterised in that m1=m=2=1, and in that the transmitter comprises means for alternately accommodating additional information in the second block sections of even blocks and not accommodating additional information in the second block sections of odd blocks.

9. Transmission system as claimed in claim 1, characterised in that the transmitter is comprised of recording means for recording information on a magnetic record carrier.

10. Transmission system as claimed in claim 9, wherein the transmitter comprises means for accommodating the additional information in the second block sections of m1 successive blocks and not in the second block sections of m2 blocks successive thereto, m1 and m2 are integres equal to or greater than one, the recording means is for recording information in the information channel on at least one track on the record carrier and arranged for recording the auxiliary signal in the auxiliary channel on at least one different track on the record carrier, and the recording means is effective for recording a signal in the second block sections of p successive blocks, where p exceeds m1, to identify a position lengthwise on the tranck on the record carrier.

11. Transmission system a claimed in claim 10, characterised in that m1=m2=1, and in that the recording means is arranged for accommodating in a second block section of an odd block in the p successive blocks the same additional information as that accommodated in the second block section of an adjacent even block.

12. Transmission system as claimed in claim 1, characterised in that the receiver is arranged for deriving the auxiliary signal from the auxiliary channel and for applying the auxiliary signal to a phase locked loop.

13. Transmission system as claimed in claim 12, characterised in that the receiver is comprised of means for reproducing information from a magnetic record carrier.

14. Transmission system as claimed in claim 13, characterised in that the means for reproducing information is comprised of an envelope detector having an input for receiving the information read from a track constituting the auxiliary channel and an output for generating a control signal, in that the envelope detector is arranged for generating in the case of a specific transport speed of the record carrier a first control signal upon detection of an envelope varying in amplitude with time and for generating a second control signal upon detection of an envelope having a constant amplitude in a specific time interval, in that the output of the envelope detector is coupled to a control signal input of transport means for transporting the record carrier, and in that the transport means are arranged for switching off this transport speed upon reception of the second control signal.

15. A transmission system as claimed in claim 6, wherein the sync signal is either the 10-bit digital number "0100111110" or "0000111110".

16. A transmitter, for transmitting digital information through an information channel of a transmission medium and for transmitting synchronization and additional information through an auxiliary channel of the transmission medium, said transmitter comprising:
  means for generating an auxiliary signal in the form of successive blocks each comprised of block sections, with the first and a directly successive second block having first block sections containing a synchronization signal and a code word and the first block having a second block section containing additional information, and the respective code words being equal if the second block section of the second block also contains additional information and the respective code words being otherwise unequal.

17. Transmitter as claimed in claim 16, characterised in that the transmitter has the form of an arrangement for recording information on a magnetic record carrier.

18. Record carrier obtained by means of the transmitter as claimed in claim 17.

19. A receiver, for receiving digital information through an information channel of a transmission medium and for receiving synchronization and additional information through an auxiliary channel of the transmission medium, the receiver comprising:
  means for detecting an auxiliary signal which is in the form of successive blocks each comprised of block sections, with the first and a directly successive second block having first block sections containing a synchronization signal and a code word and the first block having a second block section containing additional information, and the respective code words being equal if the second block section of the second block also contains additional information and the respective code words being otherwise unequal.

20. Receiver as claimed in claim 19, characterised in that the receiver is comprised of for reproducing information

* * * * *